(12) United States Patent
Tateishi

(10) Patent No.: US 12,038,825 B2
(45) Date of Patent: Jul. 16, 2024

(54) PARTIAL PROGRAM EXECUTION WITH ATTRIBUTE-BASED DATA CONVERSION FOR DYNAMIC PROGRAM ANALYSIS

(71) Applicant: INTERNATIONAL BUSINESS MACHINES CORPORATION, Armonk, NY (US)

(72) Inventor: Takaaki Tateishi, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 245 days.

(21) Appl. No.: 17/807,152

(22) Filed: Jun. 16, 2022

(65) Prior Publication Data
US 2023/0409466 A1     Dec. 21, 2023

(51) Int. Cl.
 *G06F 11/36* (2006.01)
(52) U.S. Cl.
 CPC ................ *G06F 11/3644* (2013.01)
(58) Field of Classification Search
 USPC ........................................... 717/130
 See application file for complete search history.

(56) References Cited

U.S. PATENT DOCUMENTS

| | | | | |
|---|---|---|---|---|
| 8,726,239 B2* | 5/2014 | de Halleux | ............. | G06F 9/449 717/124 |
| 8,789,032 B1* | 7/2014 | Li | ............................ | G06F 8/30 717/154 |
| 9,141,356 B2* | 9/2015 | Braude | ............... | G06F 9/30181 |
| 9,613,074 B2 | 4/2017 | Farahbod | | |
| 2011/0283264 A1 | 11/2011 | Gagliardi | | |
| 2012/0084754 A1 | 4/2012 | Ziegler | | |
| 2012/0167054 A1 | 6/2012 | Liu | | |
| 2014/0282385 A1* | 9/2014 | Dattke | ...................... | G06F 8/33 717/113 |
| 2015/0074647 A1* | 3/2015 | Levi | .................... | G06F 11/3672 717/124 |

(Continued)

FOREIGN PATENT DOCUMENTS

CN          111736846 A        6/2021

OTHER PUBLICATIONS

Chawla, et al., "A Generic Instrumentation Framework for Collecting Dynamic Information," ACM SIGSOFT Software Engineering Notes, Sep. 2004, vol. 29, Issue 5, DOI: 0.1145/1022494.1022533, 6 pages.

(Continued)

*Primary Examiner* — Qing Chen
*Assistant Examiner* — Clint Thatcher
(74) *Attorney, Agent, or Firm* — Sam Waldbaum

(57) ABSTRACT

The embodiment may include a computing device that identifies a software code. The embodiment may determine an attribute access and a method call. The embodiment may inject instrumentation code to the software code to capture the attribute access and the method call. The embodiment may convert an attribute into a value using a conversion method based on determining, during an execution of the software code, that the attribute access failed. The embodiment may create a mock object and uses the mock object as a result of the method call to continue execution of the software code based on determining, during the execution of the software code, that the method call failed.

20 Claims, 7 Drawing Sheets

(56) References Cited

U.S. PATENT DOCUMENTS

| | | | |
|---|---|---|---|
| 2015/0378880 A1* | 12/2015 | Kucharski | G06F 11/3612 717/130 |
| 2018/0024911 A1* | 1/2018 | Kruszewski | G06F 11/3664 717/125 |
| 2018/0165475 A1 | 6/2018 | Veeramachaneni | |
| 2020/0193230 A1 | 6/2020 | Greven | |
| 2020/0218638 A1 | 7/2020 | Watson | |

OTHER PUBLICATIONS

Joshi, et al., "SCARPE: A Technique and Tool for Selective Capture and Replay of Program Executions*," IEEE, ICSM 2007, Accessed on Apr. 14, 2022, https://ieeexplore.ieee.org/stamp/stamp.jsp?tp=&arnumber=4362636, pp. 234-243.

Mell et al., "The NIST Definition of Cloud Computing", National Institute of Standards and Technology, Special Publication 800-145, Sep. 2011, 7 pages.

Panchal, et al., "Code Instrumentation using Dynamic Program Analysis Tools," International Journal of Engineering Research & Technology (IJERT), Apr. 2014, pp. 207-214, vol. 3, Issue 4, ISSN: 2278-0181, Retrieved from the Internet: <URL: https://www.researchgate.net/publication/288774117_Code_Instrumentation_using_Dynamic_Program_Analysis_Tools>.

Rus et al.,"Scalable array SSA and array data flow analysis", Languages and Compilers for Parallel Computing, 18th International Workshop, LCPC, Oct. 20-22, 2005, 16 pages.

Shriya29, "Loan-Prediction-," github.com, [accessed on Apr. 11, 2022], 11 pages, Retrieved from the Internet: <URL: https://github.com/Shriya29/Loan-Prediction-/blob/master/PredictiveModel.ipynb>.

IBM, "IBM API Hub," IBM.com, Accessed: Jun. 16, 2022, https://w3.IBM.com/w3publisher/ibm-api-hub-newsletter/, 12 pages.

IBM: List of IBM Patents or Patent Applications Treated as Related (Appendix P), Jun. 16, 2022, pp. 1-2.

Tateishi et al., "Synthetic Data Creation for Dynamic Program Analysis," Application and Drawings, filed May 28, 2021, 47 Pages, Related U.S. Appl. No. 17/303,401.

* cited by examiner

```
df = pd.read_csv("C:/Users/Shriya/Desktop/Loan prediction/train.csv")
df.head(10)

df.apply(lambda x: sum(x.isnull()),axis=0)

df.boxplot(column='LoanAmount', by = ['Education','Self_Employed'])

df['Self_Employed'].fillna('No',inplace=True)

table = df.pivot_table(values='LoanAmount',
index='Self_Employed',columns='Education', aggfunc=np.median)

def fage(x):
    return table.loc[x['Self_Employed'],x['Education']]

print(table)

df['LoanAmount'].fillna(df[df['LoanAmount'].isnull()].apply(fage, axis=1),
inplace=True)

df.apply(lambda x: sum(x.isnull()),axis=0)
```

FIG. 3A

```
df = cek_ir.cek_call(cek_ir.cek_attr(pd, 'read_csv'), 'C:/Users/Shriya/Desktop/Loan prediction/train.csv')
cek_ir.cek_call(cek_ir.cek_attr(df, 'head'), 10)

cek_ir.cek_call(cek_ir.cek_attr(df, 'apply'), (lambda x: cek_ir.cek_call(sum, cek_ir.cek_call(cek_ir.cek_attr(x, 'isnull')))), axis=0)
cek_ir.cek_call(cek_ir.cek_attr(df, 'boxplot'), column='LoanAmount', by=['Education', 'Self_Employed'])

cek_ir.cek_call(cek_ir.cek_getitem(df, 'Self_Employed'), 'fillna'), 'No', inplace=True)

table = cek_ir.cek_call(cek_ir.cek_attr(df, 'pivot_table'), values='LoanAmount', index='Self_Employed', columns='Education', aggfunc=cek_ir.cek_attr(np, 'median'))

def fage(x):
    return cek_ir.cek_getitem(cek_ir.cek_attr(table, 'loc'), (cek_ir.cek_getitem(x, 'Self_Employed'), cek_ir.cek_getitem(x, 'Education')))
cek_ir.cek_call(print, table)

cek_ir.cek_call(cek_ir.cek_attr(cek_ir.cek_getitem(df, 'LoanAmount'), 'fillna'),
cek_ir.cek_call(cek_ir.cek_attr(cek_ir.cek_getitem(df, cek_ir.cek_call(cek_ir.cek_attr(cek_ir.cek_getitem(df, 'LoanAmount'), 'isnull')), 'apply'), fage, axis=1), inplace=True)
cek_ir.cek_call(cek_ir.cek_attr(df, 'apply'), (lambda x: cek_ir.cek_call(sum, cek_ir.cek_call(cek_ir.cek_attr(x, 'isnull')))), axis=0)
```

PARTIAL PROGRAM EXECUTION WITH ATTRIBUTE-BASED DATA CONVERSION FOR DYNAMIC PROGRAM ANALYSIS

BACKGROUND

The present invention relates, generally, to the field of computing, and more particularly to dynamic program analysis of tabular data-based computer software.

Dynamic program analysis is the analysis of computer software that is performed by executing programs on a real or virtual processor. For dynamic program analysis, the target program should be executed with sufficient test inputs to cover various possible outputs. Use of software testing measures such as code coverage helps to ensure that a slice of the program's set of possible behaviors has been observed.

Tabular dataset typically comprises a plurality of columns and rows that may be used to train an inference model. Dependencies among columns of such tabular data represent domain knowledge, which is useful for semantic automated feature engineering. The dynamic program analysis may be useful for analyzing a program to monitor the behavior of the program during the execution. The dynamic program analysis on a program that handles such tabular data requires preparation of actual data, which frequently is unavailable, particularly in the field of machine learning and training.

SUMMARY

According to one embodiment, a method, computer system, and computer program product for dynamic attribute-based data conversion is provided. The embodiment may include a computing device that identifies a software code. The embodiment may determine an attribute access and a method call. The embodiment may inject instrumentation code to the software code to capture the attribute access and the method call. The embodiment may convert an attribute into a value using a conversion method based on determining, during an execution of the software code, that the attribute access failed. The embodiment may create a mock object and uses the mock object as a result of the method call to continue execution of the software code based on determining, during the execution of the software code, that the method call failed.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3A depicts an original code of a software program before instrumentation according to an embodiment of the present invention;

FIG. 3B depicts an instrumented code of a software program after instrumentation using an attribute-based data conversion according to an embodiment of the present invention;

DETAILED DESCRIPTION

Figure 1:
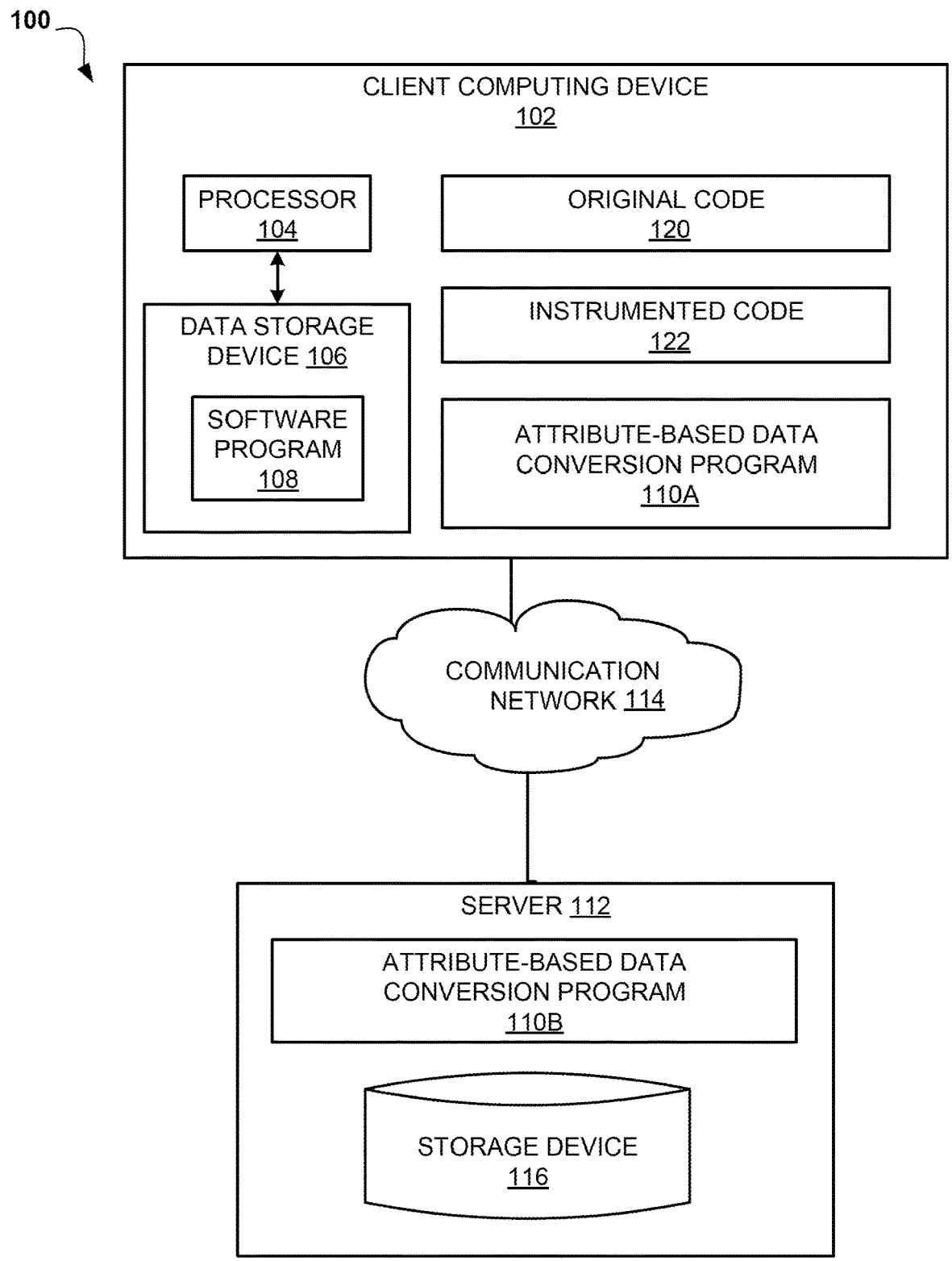
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to dynamic program analysis of tabular data-based computer software. The following described exemplary embodiments provide a system, method, and program product to, among other things, continue program execution despite errors due to dependencies with an external resource such as tabular dataset. Therefore, the present embodiment has the capacity to improve the technical field of dynamic program execution and analysis by modifying the program code of a software program during runtime to enable program execution when the external resource (such as a tabular dataset) is unavailable.

As previously described, tabular dataset typically comprises a plurality of columns and rows that may be used to train an inference model. Dependencies among columns of such tabular data represent domain knowledge, which is useful for semantic automated feature engineering. The dynamic program analysis may be useful for analyzing a program to monitor the behavior of the program during the execution. The dynamic program analysis on a program that handles such tabular data requires preparation of actual data, which frequently is unavailable, particularly in the field of inference models such as in machine learning and training models.

When the external resource of a software program is unavailable, typically program execution generates multiple errors due to dependencies with the external resource (such as tabular dataset). In order to continue the execution of the program, synthetic values similar to the external resource should be generated at runtime as a mock object. These synthetic values, in order to continue execution, should be of a specific type that may not be determined without being related to the external resource metadata. As such, it may be advantageous to, among other things, implement an embodiment that modifies an original code of the software program into an instrumented code by injecting instrumentation code to capture attribute or field accesses and method calls and return values as if the external source is available. The injected instrumentation code may generate a value based on the name of the attribute in the original code. Similarly, when the method call fails to execute due to an error, the embodiment may create a mock object and use it as a result of the execution of a method call. Furthermore, when the argument of a method call contains an argument from the mock object, a second mock object may be generated as a result of the method call to continue the execution of the software program and analyze dependencies between various attributes.

According to one embodiment, a computer-implemented method may be implemented for processing a software program, which may be written in a programming language that allows a redefinition of a method or function, as well as computer systems and computer program products for performing the computer-implemented method.

According to one or more embodiments, an initiation of execution of a software program may handle a data structure object. A synthetic (mock) data structure object may be created by using an instrumented attribute instead of handling the data structure object in a manner instructed originally in the software program, in which the mixed data object may include a first data object and a second data object. The method call may be redirected to the second data object in response to the first data object being unable to handle the method call (See FIGS. 3A-3B).

The data structure object instructed in the software program may be a 1-dimensional data structure object or a 2-dimensional data structure object, which may have attribute names (e.g., a label or a name). The mock data structure object may also be a 1-dimensional data structure object or a 2-dimensional data structure object, which may have attribute names (e.g., a label or a name). According to an example embodiment, the synthetic data structure object may be created at runtime.

According to an embodiment, a Python programming language may be utilized coupled with the Pandas' library, which is a standard library written in the Python programming language for data analysis that is incorporated into the software program. The software program may be converted by injecting a pre-defined conversion method "conv" into original code of the software program with definitions of instrumentation code "attar" and "call". Any attribute in the original code may be replaced with an attribute access "expr.name" and method call "f(args)" by "attr(expr.name)" and "call(f.args)" respectively in order to convert the original code to an instrumented code that captures attribute accesses and method calls of the software program.

According to another embodiment, the instrumented code may be executed in order for the injected instrumentation code to recover errors and handle them during runtime. According to one of the embodiments, when Python programming language coupled with the 'Pandas' library is used, the "attr(value, name)" may obtain the value of "value.name" variable. When the value of the "value.name" is not obtainable, the method may convert the value of "value" operator using a conversion method "conv" in order to obtain the value of "conv(value, 'name').name)" where the conversion method "conv" may find a value that has an attribute "name". In another embodiment, the method may try more than one conversion or obtain more than one converted value until no error is generated by the compiler or the interpreter software during execution of the instrumented code.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to inject code instrumentation into a software code in order to enable runtime analysis and resolution of errors due to missing dependencies. These exemplary embodiments may be useful in extracting column expressions for feature engineering and finding datasets used for visualizing of the datasets or it may be used for building a prediction model in machine learning.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108, original code 120, instrumented code 122, and an attribute-based data conversion program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively. The original code 120 may be any code of a software program, such as software program 120. The instrumented code 122 may be a modified original code 120 after execution of the attribute-based data conversion program 110A.

The server computer 112 may be a laptop computer, netbook computer, personal computer (PC), a desktop computer, or any programmable electronic device or any network of programmable electronic devices capable of hosting and running an attribute-based data conversion program 110B and a storage device 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the attribute-based data conversion program 110A, 110B may be a program capable of analyzing original code 120 of a source program, such as software program 108, and injecting instrumentation code 122 that captures attribute accesses and method calls in order to substitute values or objects in case of an error in order to prevent the original code from crashing. The attribute-based data conversion method is explained in further detail below with respect to FIG. 2.

Figure 2:
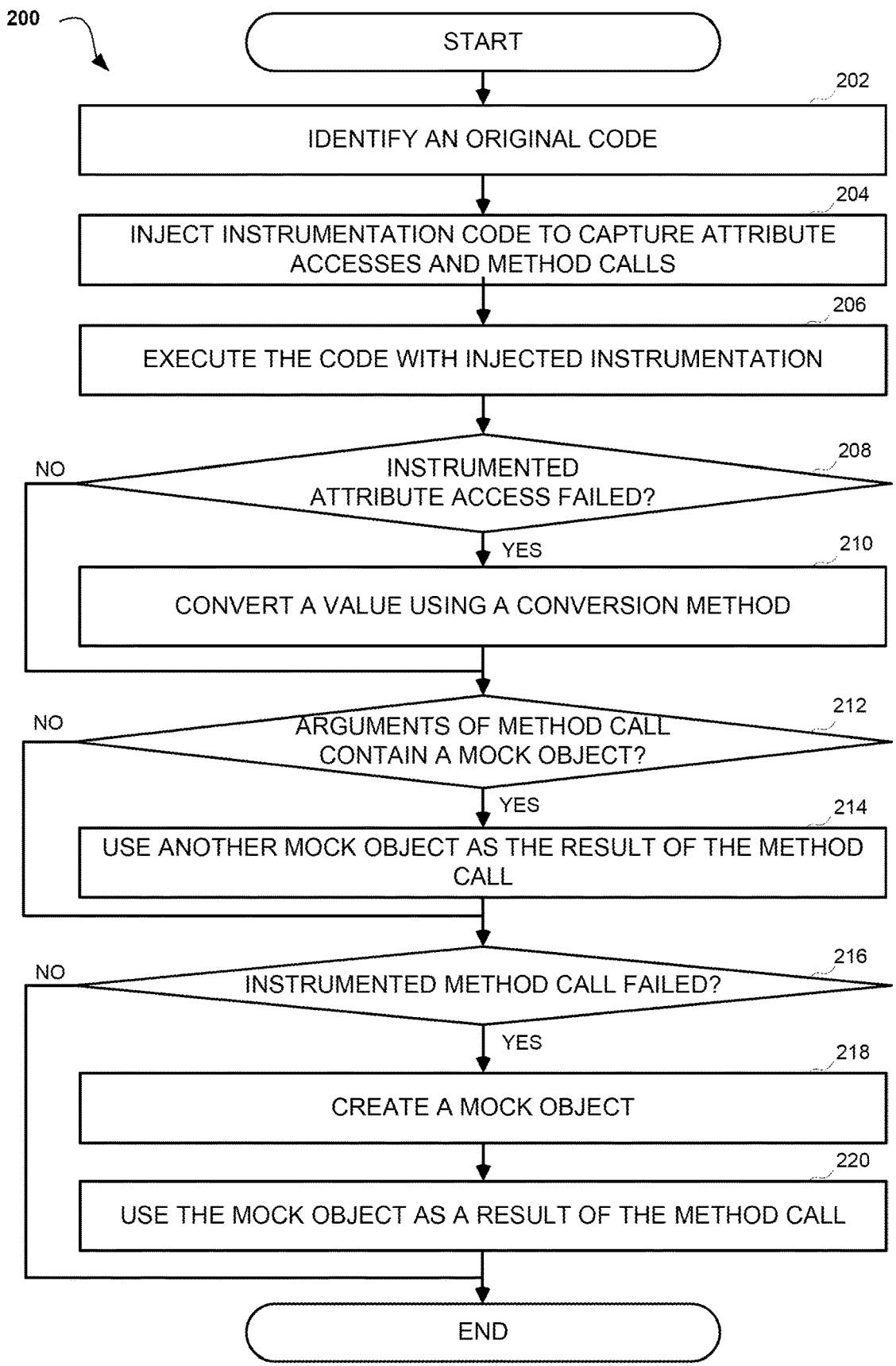
FIG. 2 is an operational flowchart illustrating an attribute-based data conversion process according to at least one embodiment.

Referring now to FIG. 2, an operational flowchart illustrating an attribute-based data conversion process 200 is depicted according to at least one embodiment. At 202, the attribute-based data conversion program 110A, 110B identifies original code 120. According to an example embodiment, the attribute-based data conversion program 110A, 110B may request a user, using a graphical user interface (GUI), to identify a file of an original code such as original code 120 depicted in FIG. 1. In another embodiment, a GUI may request the user to enter a path for the software program, such as software program 108, and convert it to original code 120 at the predefined location.

Next, at 204, the attribute-based data conversion program 110A, 110B injects instrumented code 122 to capture attribute accesses and method calls. According to an example embodiment, the attribute-based data conversion program 110A, 110B may insert instrumented code 122 in order to capture attribute or field accesses and method calls. For example, in a Python coding language, the attribute-based data conversion program 110A, 110B may change every attribute access in a format of "expr.name" into "attr(expr-.name)" while any method call "f(args)" is replaced with "call(f, args)". The identification of attributes and method calls may be performed using text processing such as natural language processing (NLP) or program rewriting via abstract syntax tree (AST). For example, FIGS. 3A and 3B depict examples of original code 120 and instrumented code 122, respectively. In another embodiment, the attribute-based data conversion program 110A, 110B may change the code of already compiled program, such as software program 108, by decompiling and injecting the instrumented code 122. For example, the attribute-based data conversion program 110A, 110B may use bytecode translator, such as Python decompiler, to translate software program 108 into original code 120 and then insert instrumented code 122 to generate and execute the instrumented code 122.

Then, at 206, the attribute-based data conversion program 110A, 110B executes the code with injected instrumentation. According to an example embodiment, the attribute-based data conversion program 110A, 110B may use an interpreter to execute the code without requiring compilation into a machine language program. In another embodiment, the attribute-based data conversion program 110A, 110B may compile the code with injected instrumented code 122 and then enable execution by receiving an input from a user via GUI.

Next, at 208, the attribute-based data conversion program 110A, 110B determines whether instrumented attribute access failed. Typically, any unsuccessful execution of a computer code returns an error code or error string that may be received and analyzed by the attribute-based data conversion program 110A, 110B using an application programming interface (API) or by actively analyzing the log data of a compiler or an interpreter. If the attribute-based data conversion program 110A, 110B determines that the instrumented attribute access failed (step 208, "YES" branch), the attribute-based data conversion program 110A, 110B may continue to step 210 to convert a value using a conversion method. If the attribute-based data conversion program 110A, 110B determines instrumented attribute access did not fail (step 208, "NO" branch), the attribute-based data conversion program 110A, 110B may continue to step 212 to determine whether instrumented method call failed.

Then, at 210, the attribute-based data conversion program 110A, 110B converts a value using a conversion method. According to an example embodiment, the attribute-based data conversion program 110A, 110B may convert the value using a pre-defined conversion method, such as a "conv" method in Python programming language, that converts the value to another value having a specific attribute. For example, when "attr(value,name)" fails due to an error, the value may be generated using the "conv(value, 'name')" .name" method where the conversion method "conv" finds a value that has the attribute "name". In another embodiment, the attribute-based data conversion program 110A, 110B may use other conversion techniques, such as from a trained neural network that may receive a name of the attribute and return a value, or to try to obtain more than one converted value using different approaches.

Next, at 212, the attribute-based data conversion program 110A, 110B determines whether arguments of the method call contain a mock object. According to an example embodiment, the attribute-based data conversion program 110A, 110B may access the attributes of the method call and compare the attributes to the created mock object using an application programming interface (API) or by actively analyzing the log data. If the attribute-based data conversion program 110A, 110B determines that one or more attributes are of a mock object (step 212, "YES" branch), the attribute-based data conversion program 110A, 110B may continue to step 214 to use another mock object as the result of the method call. If the attribute-based data conversion program 110A, 110B determines that the attributes of the method call are not of the mock object (step 212, "NO" branch), the attribute-based data conversion program 110A, 110B may continue to step 216 to determine whether the instrumented method call failed.

Then, at 214, the attribute-based data conversion program 110A, 110B uses another mock object as the result of the method call. According to an example embodiment, when the attribute-based data conversion program 110A, 110B determines that arguments of the method call contains one or more mock objects, such as when "args" from "call(f, args)" contain a mock object, the mock object is returned instead of the call.

Next, at 216, the attribute-based data conversion program 110A, 110B determines whether the instrumented method call failed. According to an example embodiment, any unsuccessful execution of a method call returns an error code to the executing environment that may be accessed by the attribute-based data conversion program 110A, 110B using an application programming interface (API) or by actively analyzing the log data. If the attribute-based data conversion program 110A, 110B determines that the method call failed (step 216, "YES" branch), the attribute-based data conversion program 110A, 110B may continue to step 218 to create a mock object as a return of the failed method call. If the attribute-based data conversion program 110A, 110B determines that the method call did not fail (step 216, "NO" branch), the attribute-based data conversion program 110A, 110B may terminate.

Then, at 218, the attribute-based data conversion program 110A, 110B creates a mock object. According to an example embodiment, the attribute-based data conversion program 110A, 110B may create a synthetic data structure object in response to a method being called to handle the data structure object instead of handling the data structure object in a manner instructed originally in the original code 120. According to one of the embodiments, the synthetic data structure object may be created based on analyzing the method call names or other data available in the original code 120, such as names of the methods, notes or comments to the lines of code.

Next, at 220, the attribute-based data conversion program 110A, 110B uses the mock object as the result of the method call. According to an example embodiment, the attribute-based data conversion program 110A, 110B may use the mock object as the result of the method call in order to continue execution of the instrumented code 122.

Referring now to FIGS. 3A and 3B, an original code 120 and an instrumented code 122 of a software program are depicted according to at least one embodiment. According to an example embodiment, the attribute-based data conversion program 110A, 110B may analyze original code 120 depicted in FIG. 3A to identify all of the attributes and method calls and injects instrumented code 122 as shown if FIG. 3B that enables the compiler or interpreter software to continue an execution of the software program even when the attributes or method calls return errors due to unavailability of an external dataset.

It may be appreciated that FIGS. 2 and 3A-3B provide only an illustration of one implementation and does not imply any limitations with regard to how different embodiments may be implemented. Many modifications to the depicted environments may be made based on design and implementation requirements.

Figure 4:
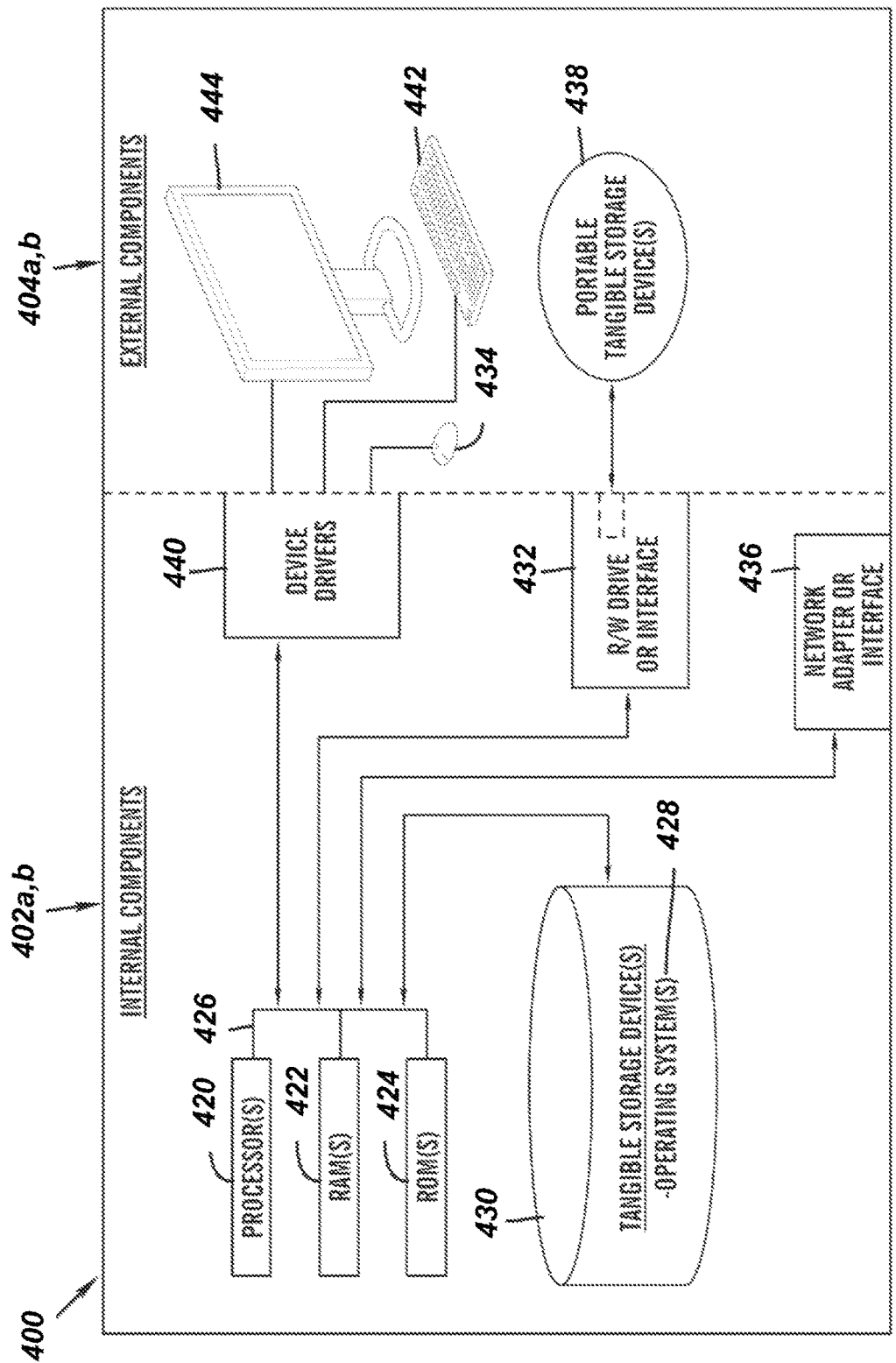
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the attribute-based data conversion program 110A in the client computing device 102, and the attribute-based data conversion program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the attribute-based data conversion program 110A, 110B, can be stored on one or more of the respective portable computer-readable tangible storage devices 438, read via the respective RAY drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the attribute-based data conversion program 110A in the client computing device 102 and the attribute-based data conversion program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the attribute-based data conversion program 110A in the client computing device 102 and the attribute-based data conversion program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
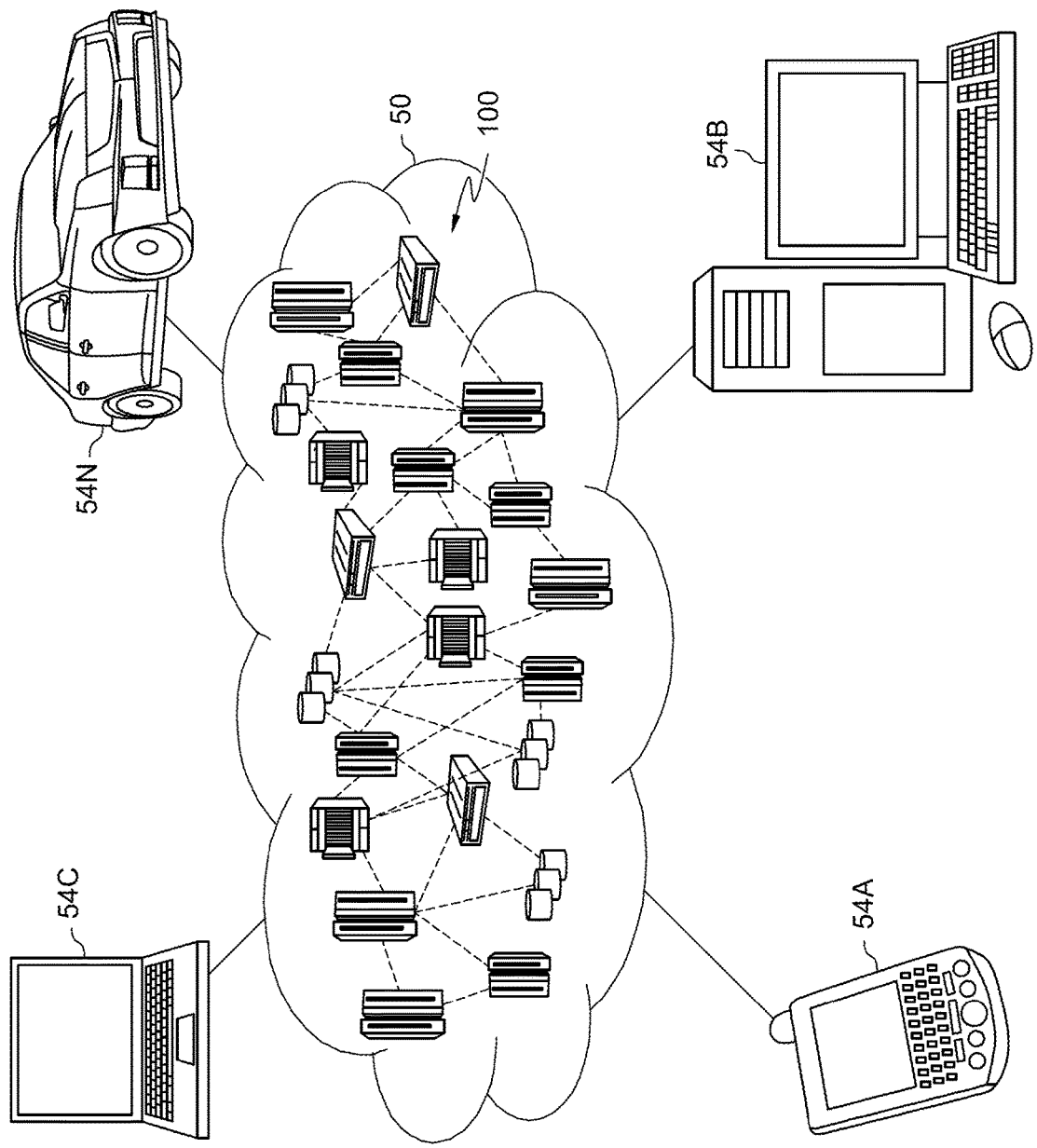
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
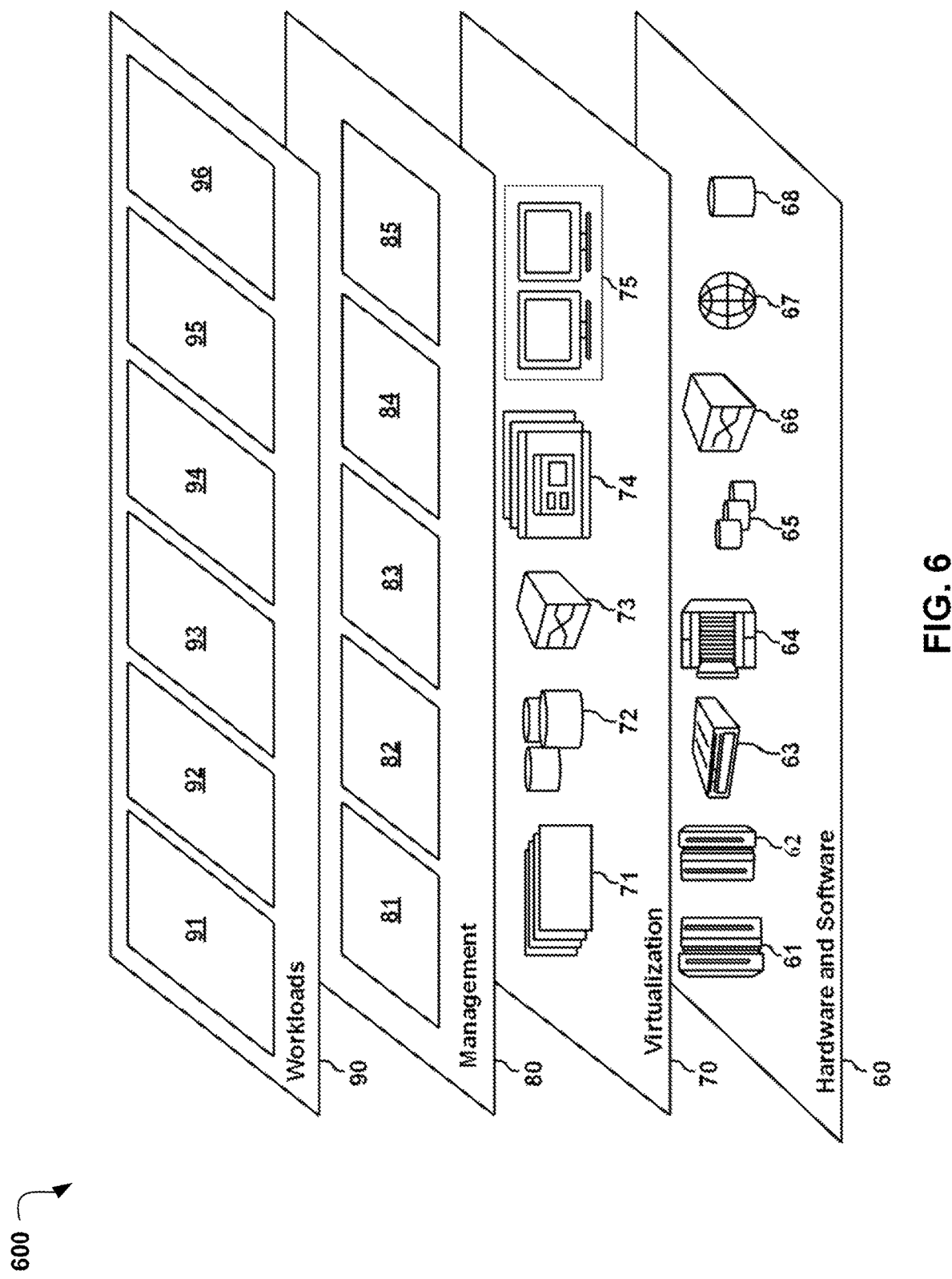
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and attribute-based data conversion 96. Attribute-based data conversion 96 may relate to identifying or generating original code from a software program and inserting instrumented code that substitutes attribute accesses and method calls in order to enable execution of the software program when one or more external datasets required by the software program are unavailable.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for attribute-based data conversion, the method comprising:
   identifying software code;
   determining an attribute access and a method call within the software code;
   injecting instrumented code into the software code to capture the attribute access and the method call;
   based on determining, during an execution of the software code, that the attribute access failed, converting an attribute into a value using a conversion method; and
   based on determining, during the execution of the software code, the method call failed:
   creating a mock object; and
   using the mock object, as a result of the method call, to continue the execution of the software code.

2. The method of claim 1, further comprising:
   based on determining an argument of the method call contains the mock object using another mock object as the result of the method call.

3. The method of claim 1, wherein the software code is in a Python programming language.

4. The method of claim 1, wherein the conversion method uses a name of the attribute to generate the value.

5. The method of claim 1, wherein the mock object is a synthetic data structure object generated using an instrumented attribute.

6. The method of claim 1, wherein determining the attribute access and the method call in the software code is by using natural language processing.

7. The method of claim 1, wherein determining, during the execution of the software code, that the attribute access failed is performed using an application programming interface.

8. A computer system for attribute-based data conversion, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   identifying software code;
   determining an attribute access and a method call within the software code;
   injecting instrumented code into the software code to capture the attribute access and the method call;
   based on determining, during an execution of the software code, that the attribute access failed, converting an attribute into a value using a conversion method;
   based on determining, during the execution of the software code, the method call failed:
   creating a mock object; and
   using the mock object, as a result of the method call, to continue the execution of the software code.

9. The computer system of claim 8, further comprising:
   based on determining an argument of the method call contains the mock object using another mock object as the result of the method call.

10. The computer system of claim 8, wherein the software code is in a Python programming language.

11. The computer system of claim 8, wherein the conversion method uses a name of the attribute to generate the value.

12. The computer system of claim 8, wherein the mock object is a synthetic data structure object generated using an instrumented attribute.

13. The computer system of claim 8, wherein determining the attribute access and the method call in the software code is by using natural language processing.

14. The computer system of claim 8, wherein determining, during the execution of the software code, that the attribute access failed is performed using an application programming interface.

15. A computer program product for attribute-based data conversion, the computer program product comprising:
   one or more computer-readable tangible storage medium and program instructions stored on at least one of the one or more tangible storage medium, the program instructions executable by a processor, the program instructions comprising:
   program instructions to identify software code;
   program instructions to determine an attribute access and a method call within the software code;
   program instructions to inject instrumented code into the software code to capture the attribute access and the method call;
   based on determining, during an execution of the software code, that the attribute access failed, program instructions to convert an attribute into a value using a conversion method; and
   based on determining, during the execution of the software code, the method call failed:
   program instructions to create a mock object; and
   program instructions to use the mock object, as a result of the method call, to continue the execution of the software code.

16. The computer program product of claim 15, further comprising:
   based on determining an argument of the method call contains the mock object program instructions to use another mock object as the result of the method call.

17. The computer program product of claim 15, wherein the software code is in a Python programming language.

18. The computer program product of claim 15, wherein the conversion method uses a name of the attribute to generate the value.

19. The computer program product of claim 15, wherein the mock object is a synthetic data structure object generated using an instrumented attribute.

20. The computer program product of claim 15, wherein program instructions to determine the attribute access and the method call in the software code is by program instructions to use natural language processing.

* * * * *